(12) United States Patent
Agostini et al.

(10) Patent No.: US 8,057,204 B2
(45) Date of Patent: Nov. 15, 2011

(54) TIRE CURING BLADDER

(75) Inventors: Giorgio Agostini, Colmar-Berg (LU);
Massimo Di Giacomo Russo, Olm (LU); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 610 days.

(21) Appl. No.: 12/237,411

(22) Filed: Sep. 25, 2008

(65) Prior Publication Data

US 2009/0159215 A1 Jun. 25, 2009

Related U.S. Application Data

(60) Provisional application No. 61/015,452, filed on Dec. 20, 2007.

(51) Int. Cl.
B29C 35/00 (2006.01)
B29D 30/06 (2006.01)

(52) U.S. Cl. .......................... 425/52; 425/43
(58) Field of Classification Search ............. 425/43, 425/52
See application file for complete search history.

(56) References Cited

U.S. PATENT DOCUMENTS

| | | | |
|---|---|---|---|
| 2,695,424 A * | 11/1954 | Madison et al. | 425/53 |
| 2,730,763 A * | 1/1956 | Brundage | 425/33 |
| 3,837,770 A * | 9/1974 | Gazuit | 425/52 |
| 3,963,394 A | 6/1976 | Shichman et al. | 425/51 |
| 3,989,429 A * | 11/1976 | Mattson | 425/52 |
| 4,082,490 A | 4/1978 | Château | 425/412 |
| 4,197,064 A * | 4/1980 | MacMillan | 425/52 |
| 4,776,781 A | 10/1988 | Sakai | 425/48 |
| 5,403,174 A | 4/1995 | Ushikubo et al. | 425/43 |
| 7,128,545 B2 * | 10/2006 | Wang et al. | 425/52 |
| 7,144,236 B2 | 12/2006 | Wang et al. | 425/52 |
| 2008/0084007 A1 | 4/2008 | Szyms | 264/326 |

FOREIGN PATENT DOCUMENTS

| | | |
|---|---|---|
| EP | 1 629 963 A1 | 3/2006 |
| GB | 938797 | 10/1963 |
| GB | 951049 | 3/1964 |
| JP | 57 032932 | 2/1982 |

OTHER PUBLICATIONS

European Search Report completed Mar. 25, 2009.

* cited by examiner

*Primary Examiner* — James Mackey
(74) *Attorney, Agent, or Firm* — June E. Rickey

(57) ABSTRACT

An expandable bladder for shaping a pneumatic tire is provided. The bladder in an unmounted, relaxed state has a shaped body having a pair of opposed annular beads, said body further comprising a central portion, sidewall portions, and shoulder portions interposed between the central portion and the sidewall portions, wherein the body is defined by an outer contour surface and an inner contour surface, wherein the central portion has gauge which increases to a maximum value axially inward of the shoulder portion, and wherein the bladder gauge in the shoulder is less than the maximum value, and wherein the bladder gauge increases from the shoulder to the bead.

8 Claims, 3 Drawing Sheets

TIRE CURING BLADDER

This application claims the benefit of, and incorporates by reference, U.S. Provisional Application No. 61/015,452 filed Dec. 20, 2007.

FIELD OF THE INVENTION

The present invention is directed towards a tire curing bladder, and more particularly for towards a curing bladder used in a tire curing press wherein the bladder shape is optimized for a runflat or low aspect ratio tire.

BACKGROUND OF THE INVENTION

Pneumatic rubber tires are produced by molding and curing a green tire in a tire press. The green tire is pressed outwardly against a mold surface by an inner bladder which is expanded inside the tire by fluid. The green tire is shaped against the mold wherein the sidewalls and tread is shaped. By application of heat and pressure, the tire is molded and cured at elevated temperatures.

It is important that the bladder be designed to fit the green tire, so that the bladder remains in contact with the tire. One problem that may occur during expansion of the bladder into the tire mold is that the shoulder portion of the bladder does not engage the shoulder of the tire. This problem may be greater in the case of low aspect ratio tires and run on flat tires. Prior art existing bladder designs were established based on experiences with regular aspect ratio tires. If a bladder for a regular aspect ratio tire is used to shape a low aspect ratio tire, problems may occur due to poor bladder/tire fitment. For example, problems may be due to an undesirable contact sequence or locally too high contact pressure, trapped air, severe rubber squeeze in a local area, and non-uniformity. This can result in uncontrolled distortions in the insert and innerliner geometries during shaping as well as innerliner flow. The bladder shape mismatch may also cause liner buckling in the shoulder area of the tire. Thus an improved bladder shape is desired which more closely matches the green tire geometry and prevents the distortion of the cured tire.

SUMMARY OF THE INVENTION

The invention provides in a first aspect an expandable bladder for shaping a pneumatic tire to be mounted in a tire curing press. The bladder in an unmounted, relaxed state comprises: a body having a pair of opposed annular beads, said body further comprising a central portion, sidewall portions, and shoulder portions interposed between the central portion and the sidewall portions, wherein the body is defined by an outer contour surface and an inner contour surface, wherein outer contour surface is different than the inner contour surface.

The invention provides in a second aspect an expandable bladder for shaping a pneumatic tire to be mounted in a tire curing press. The bladder in an unmounted, relaxed state comprises a shaped body having a pair of opposed annular beads, said body further comprising a central portion, sidewall portions, and shoulder portions interposed between the central portion and the sidewall portions, wherein the body is defined by an outer contour surface and an inner contour surface. The central portion has a gauge which increases to a maximum value axially inward of the shoulder portion, and wherein the bladder gauge in the shoulder is less than the maximum value, and wherein the bladder gauge increases from the shoulder to the bead. The expandable bladder preferably has a central portion wherein the thickness of the bladder decreases from its center to a minimum point, and then increases to a maximum value of the central portion at a location radially inward of the shoulder portion.

DEFINITIONS

"Aspect Ratio" means the ratio of a tire's section height to its section width.

"Axial" and "axially" means the lines or directions that are parallel to the axis of rotation of the bladder.

"Radial" and "radially" mean directions radially toward or away from the axis of rotation of the bladder.

BRIEF DESCRIPTION OF THE DRAWINGS

The invention will be described by way of example and with reference to the accompanying drawings in which.

DETAILED DESCRIPTION OF THE INVENTION

Figure 1:
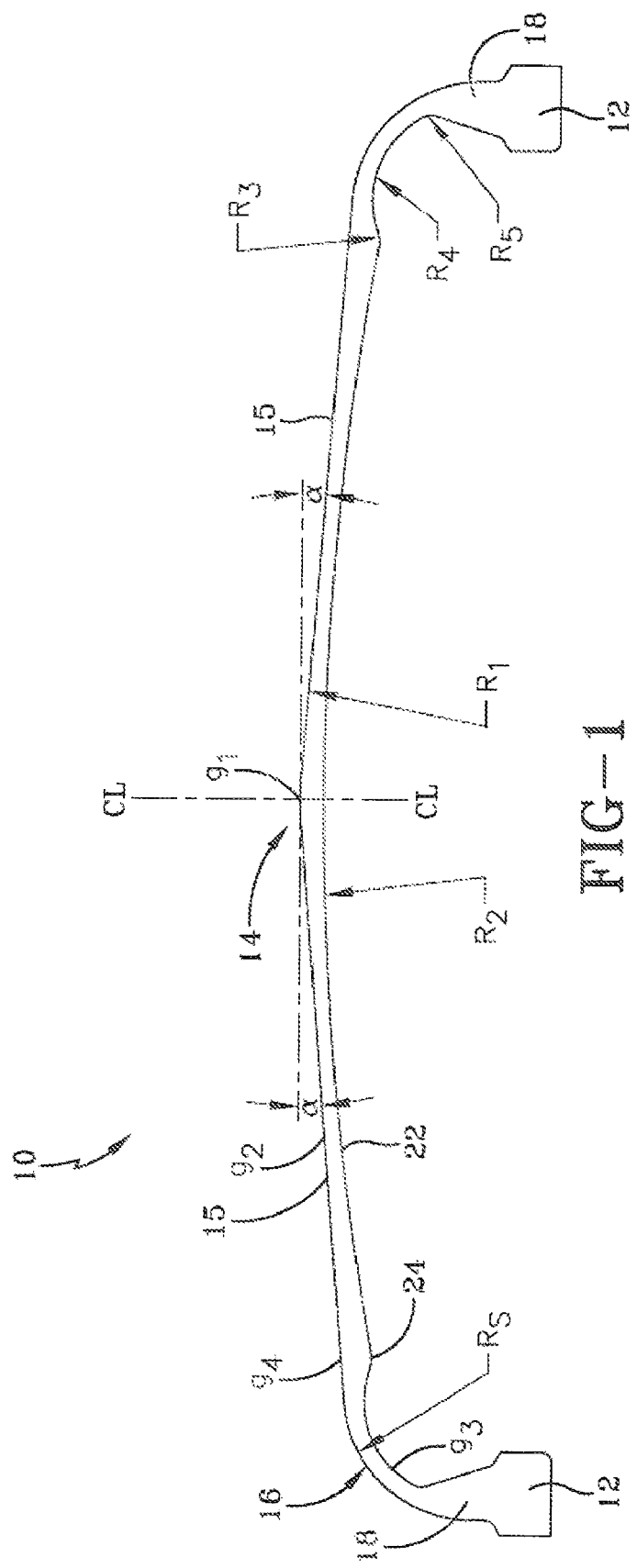
FIG. 1 is a cross sectional view of a bladder of the invention.
Figure 2:
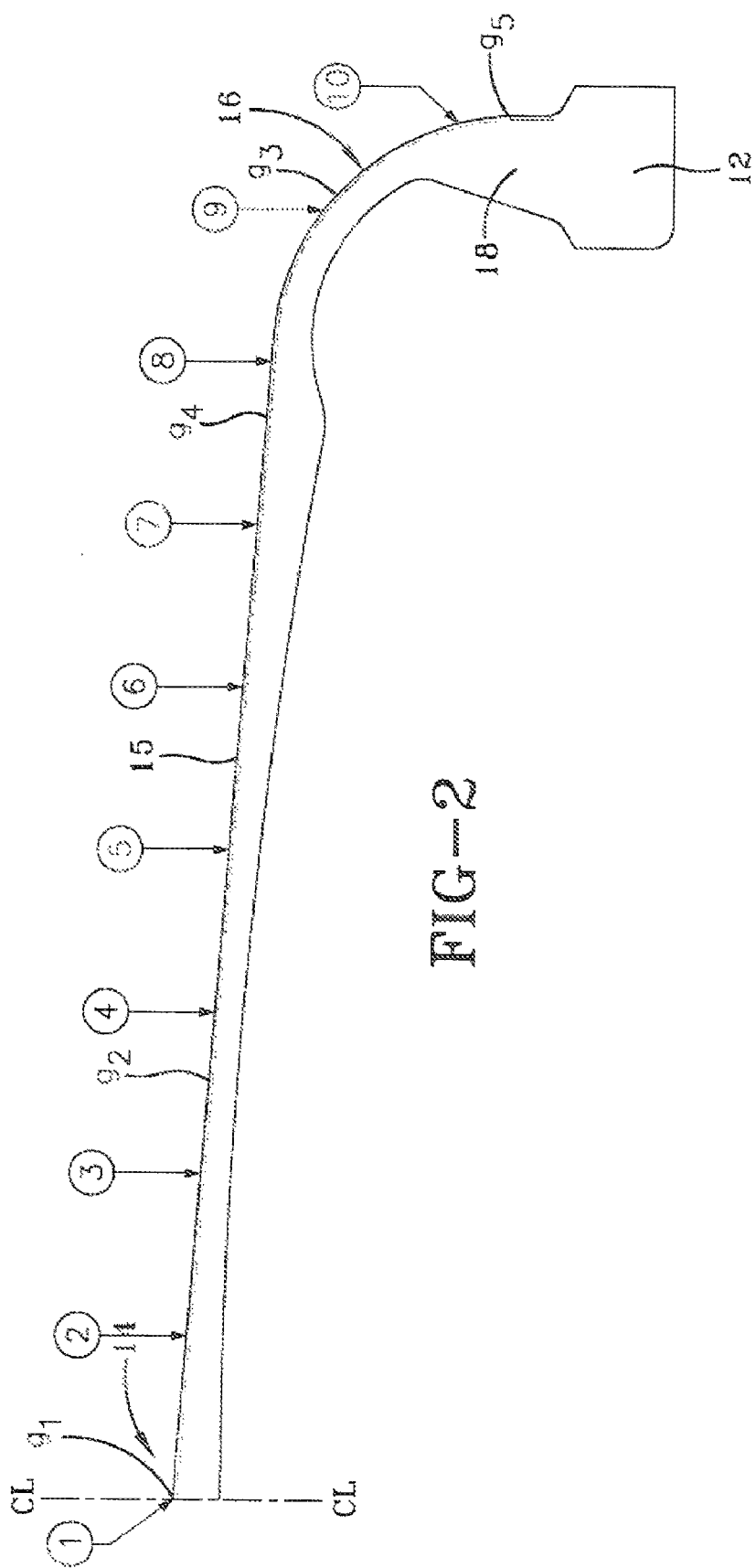
FIG. 2 is a close-up cross-sectional view of the bladder of FIG. 1.

FIG. 1 illustrates a first embodiment of a bladder of the invention. The illustrated profile is that of a bladder as formed and in an uninflated relaxed state, not necessarily of the bladder mounted in a tire curing press. The bladder 10 has an approximate toroidal shape, with an opening at the inner side. The bladder 10 has a pair of annular retaining beads 12 for securing the beads to press clamping assembly (not shown). Located between the annular beads is the expansion section of the bladder. The expansion section of the bladder 10 has a central portion 14, shoulder portions 16, and sidewall portions 18. Preferably, the bladder is symmetrical about an equatorial plane.

The central portion 14 of the bladder has an outer contour surface 15 that is sloped or angled from the equatorial plane to the shoulder area 16. The outer contour surface may also be flat, depending upon the shape of the tire mold. Preferably, the outer contour surface 15 is sloped at an angle $\alpha$ with a value typically in the range of about 0 to about 8 degrees, more preferably from about 2 to about 6 degrees and typically about 4 degrees. The shape of the outer contour surface 15 may also vary as dictated by the mold.

The outer contour surface 15 in the shoulder area 16 is radiused wherein the outer shoulder radius $R_S$ is substantially smaller than the radius $R_1$ of the outer contour surface 15. For example, the radius $R_1$ may range from about 1 to about 3 inches, more typically about 1.5 inches, while the radius Rs may range from about 30 mm to about 100 mm, more typically about 40 to 70 mm, more preferably about 60-70 mm. The transition of the outer contour surface 15 between the center portion 14 and the shoulder portion 16 is smooth (i.e., the shoulder radius is tangent to the central radius. The outer contour surface of the shoulder area joins with the outer sidewall portion 18 forming a smooth transition of a 90 degree bend. The sidewall portion forms a straight line down to the bead area 12.

The bladder 10 has an inner contour surface 20, which may have a different curvature than the outer contour surface. The inner contour surface 20 has a large radius R2 in the central portion 14, which may be 10 inches or more, more particularly in the range of about 15 to about 50 and most preferably about 30 to 40 inches. As a result of the geometric contours of the outer contour surface 15 and the inner contour surface, the bladder gauge varies in the central portion 14. The bladder gauge has an initial thickness or gauge $g_1$ thickness which ranges from about 4 mm to about 8 mm. The gauge of the bladder decreases from the equatorial plane as measured axially outward from the centerline. In the example embodiment shown, the bladder gauge decreases to a minimum value g2 at location 22. The minimum value g2 is in the range of about 4 to about 10 mm, and more preferably about 7 mm and most preferably about 5 mm. Location 22 is located in the range of one third to two thirds the distance from the center to the shoulder 16. The bladder gauge then increases from 22 out to the transition area 24 of the shoulder location. Preferably, the bladder gauge reaches a maximum value g4 at location 24. G4 may range from about 8 mm, to about 10 mm, preferably about 9 mm. The ratio of g4/g1 may range from about 0.1 to about 1.0, more preferably about 0.5 to about 0.9, and most preferably about 0.7. The ratio of g2/g1 may range from about 0.1 to about 1, more preferably about 0.6 to about 1, and most preferably about 0.8.

The transition area 24 of the inner contour line 20 is formed from a second radiused portion R3 wherein the center of R3 is located outside of the bladder's inner contour. R3 has a much smaller value than R2 and may range from about 0.25 to about 1 inch. The R3 curve is blended with the curve of R2 to form a smooth curve. Next, the inner contour surface in the shoulder area 16 transitions to a radius R4, wherein R4 has a center that is located within the interior portion of the bladder profile. R4 may range from about 0.5 to about 3, more typically about 1 to about 2 inches, and more particularly about 1.5 inches. The gauge of the bladder is decreases from point 24 to the shoulder area 16, making it easier for the bladder to expand in the shoulder area. The shoulder area has a gauge g3, which ranges from about 4. to about 10. mm, more preferably about 4. to about 6. mm and most preferably about 5. mm. The ratio of g3/g1 may range from about 0.1 to about 10., more preferably about 0.6 to about 0.9 and most preferably about 0.7. The ratio of g3/g4 may range from about 0.1 to about 1, more preferably about 0.3 to about 0.7, and most preferably about 0.5.

Figure 3:
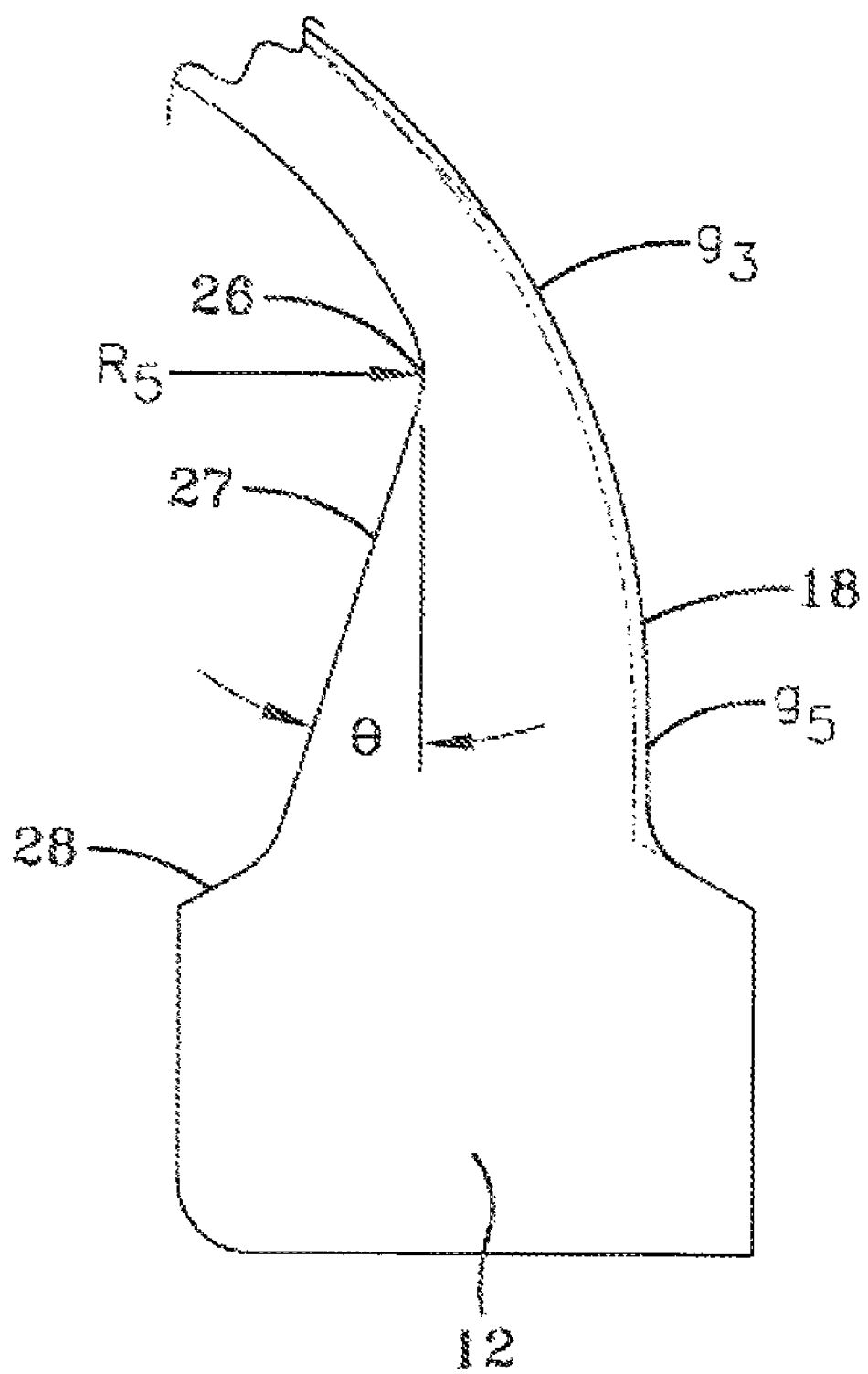
FIG. 3 is a close-up view of the bead portion of the bladder of FIG. 1.

As best shown in FIG. 3, the bladder gauge increases at a dramatic rate from the shoulder point 26 radially inward to the bead 23. The inner contour line 20 forms an angular surface 27 oriented at an angle θ which is angled in the range of about 10 to about 25 degrees. The bladder gauge increases from the shoulder to the bead area to reduce the bead strain and to improve the life of the bladder. The bladder gauge g5 may range from about 4. to about 7. mm. The ratio of g5/g4 may range from about 1 to about 4, more preferably about 1 to about 3 and most preferably about 2.

Thus, the bladder gauge at the equatorial plane has an initial value g1, which decreases to a value g2, increases to a value g4, decreases abruptly in the shoulder to a value g3, and increases to a maximum value g5 in the bead area.

In one example, the bladder may have the gauge distribution as indicated in Table I, below, wherein the positions are labeled numerically on FIG. 1.

TABLE I

Bladder Gauge distribution

| Position | Gauge, mm |
| --- | --- |
| 1 | 7.35 |
| 2 | 4.6 |

TABLE I-continued

Bladder Gauge distribution

| Position | Gauge, mm |
| --- | --- |
| 3 | 4.03 |
| 4 | 5.68 |
| 5 | 5.13 |
| 6 | 7.71 |
| 7 | 4.97 |
| 8 | 9.02 |
| 9 | 4.79 |
| 10 | 4.77 |

The bladder 10 may be formed from conventional expandable and durable materials, preferably rubber. The bladder material should be strong enough and pliable enough to withstand internal pressures of fluid to force a green tire into a molded cavity, strong enough to withstand green tire resistance, be tear or puncture resistant, and also have thermoconductive properties to transmit heat through the gauge thickness for efficient and consistent curing of tires. The bladder material preferably has a tensile strength in the range of 8-16 MPa, a percent elongation at break in the range of 400-1500, and a 300% modulus in the range of 2-8 MPa.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An expandable bladder for shaping a pneumatic tire to be mounted in a tire curing press, the bladder in an unmounted, relaxed state comprises:
    a shaped body having a pair of opposed annular beads, said body further comprising a central portion, sidewall portions, and shoulder portions interposed between the central portion and the sidewall portions, wherein the body is defined by an outer contour surface and an inner contour surface, wherein the outer contour surface is shaped differently than the inner contour surface, wherein a bladder gauge of the central portion decreases from a center point to a minimum point located between the center point and the shoulder portion, and then the bladder gauge increases from said minimum point to a maximum point located axially inward of the shoulder portion.

2. The bladder of claim 1 wherein a shoulder portion radius of the inner contour surface is substantially smaller than a central portion radius.

3. The bladder of claim 1 wherein a shoulder portion radius of the outer contour surface is substantially smaller than a central portion radius.

4. The bladder of claim 1 wherein the bladder gauge increases from the shoulder portion to a bead area.

5. The bladder of claim 1 wherein the ratio of a shoulder portion gauge (g3) to a maximum central portion gauge (g4) located between the shoulder portions is in the range of about 0.1 to about 1.

6. The bladder of claim 1 wherein the central portion of the bladder has a minimum gauge (g2) in the range of about 4 to about 10 mm, and a maximum gauge (g4), in the range of about 8 mm to about 10 mm.

7. The bladder of claim 1 wherein the ratio of a shoulder portion gauge (g3) to a maximum central portion gauge (g4) is in the range of about 0.3 to about 0.7.

8. An expandable bladder for shaping a pneumatic tire to be mounted in a tire curing press, the bladder in an unmounted, relaxed state comprises:
a shaped body having a pair of opposed annular beads, said body further comprising a central portion, sidewall portions, and shoulder portions interposed between the central portion and the sidewall portions, wherein the body is defined by an outer contour surface and an inner contour surface, wherein the outer contour surface is shaped differently than the inner contour surface, wherein a maximum bladder gauge is located between the central portion and the shoulder portion, wherein the thickness of the bladder in the central portion decreases from its center plane to a minimum bladder gauge, and then increases to the maximum bladder gauge at a location axially inward of the shoulder portion.

* * * * *